(12) United States Patent
Nam et al.

(10) Patent No.: US 12,520,363 B2
(45) Date of Patent: Jan. 6, 2026

(54) BEAM FAILURE RECOVERY SEARCH SPACE SET MONITORING ENHANCEMENTS

(71) Applicant: QUALCOMM Incorporated, San Diego, CA (US)

(72) Inventors: Wooseok Nam, San Diego, CA (US); Tao Luo, San Diego, CA (US); Yuchul Kim, San Diego, CA (US); Wanshi Chen, San Diego, CA (US); Junyi Li, Fairless Hills, PA (US); Min Soo Sim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 17/818,665

(22) Filed: Aug. 9, 2022

(65) Prior Publication Data

US 2024/0057189 A1    Feb. 15, 2024

(51) Int. Cl.
*H04W 76/19*    (2018.01)
*H04W 72/23*    (2023.01)
*H04W 74/0833*    (2024.01)

(52) U.S. Cl.
CPC .......... *H04W 76/19* (2018.02); *H04W 72/23* (2023.01); *H04W 74/0833* (2013.01)

(58) Field of Classification Search
CPC .. H04W 76/19; H04W 72/23; H04W 74/0833
See application file for complete search history.

(56) References Cited

U.S. PATENT DOCUMENTS

| | | | |
|---|---|---|---|
| 2021/0368484 A1* | 11/2021 | Xu | H04L 27/26025 |
| 2022/0330215 A1* | 10/2022 | Lai | H04W 76/19 |
| 2023/0199659 A1* | 6/2023 | Zhou | H04L 5/0078 370/318 |
| 2023/0300854 A1* | 9/2023 | Agiwal | H04W 72/12 |

* cited by examiner

*Primary Examiner* — Jackie Zuniga Abad
(74) *Attorney, Agent, or Firm* — Patterson+ Sheridan, L.L.P.

(57) ABSTRACT

Certain aspects of the present disclosure provide techniques for improving a beam failure recovery procedure when control channel monitoring adaptions are enabled. An example method includes receiving, from a network entity, configuration information comprising at least one of a physical downlink control channel (PDCCH) monitoring skipping configuration or a search space (SS) set group (SSSG) switching configuration, detecting a beam failure of a beam used for communicating with the network entity, and in response to the detected beam failure, taking one or more actions to monitor a beam failure recovery (BFR) SS set for a BFR response from the network entity based, in part, on the configuration information.

23 Claims, 12 Drawing Sheets

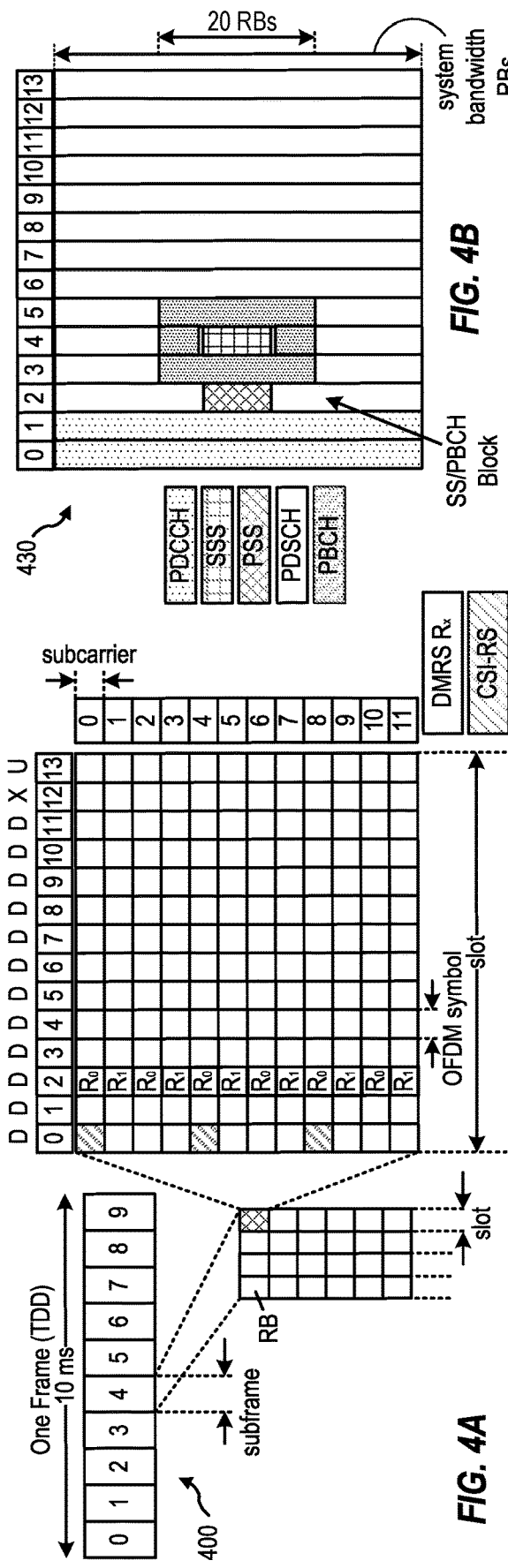
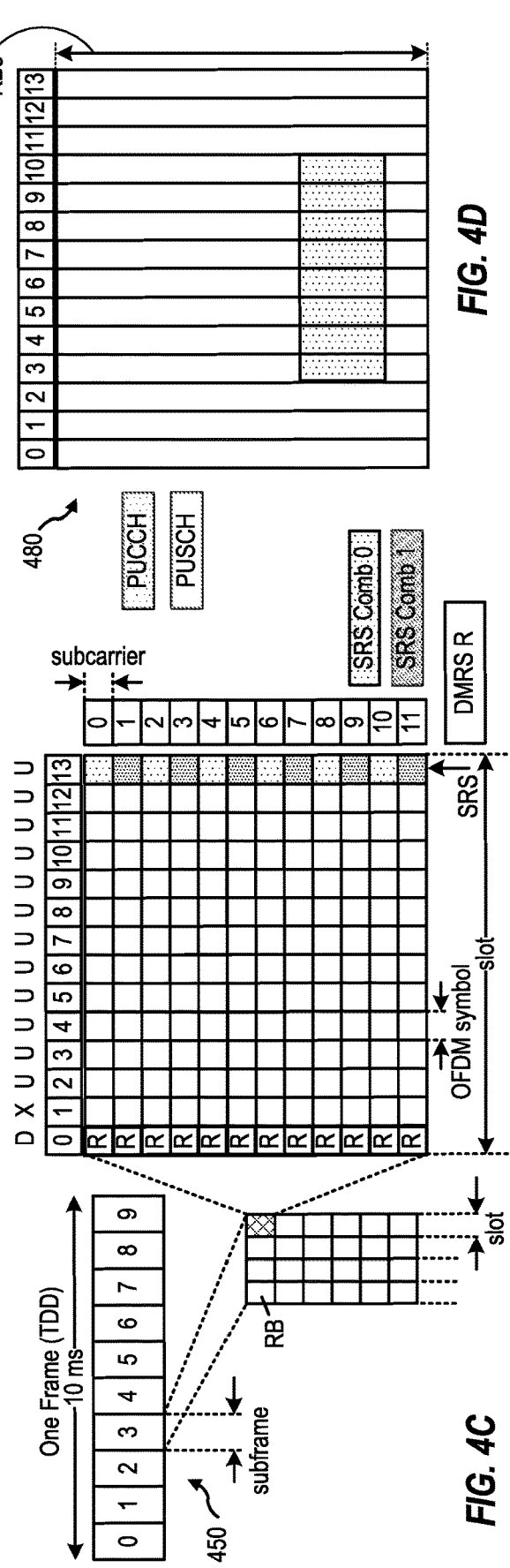
FIG. 4A  FIG. 4B  FIG. 4C  FIG. 4D

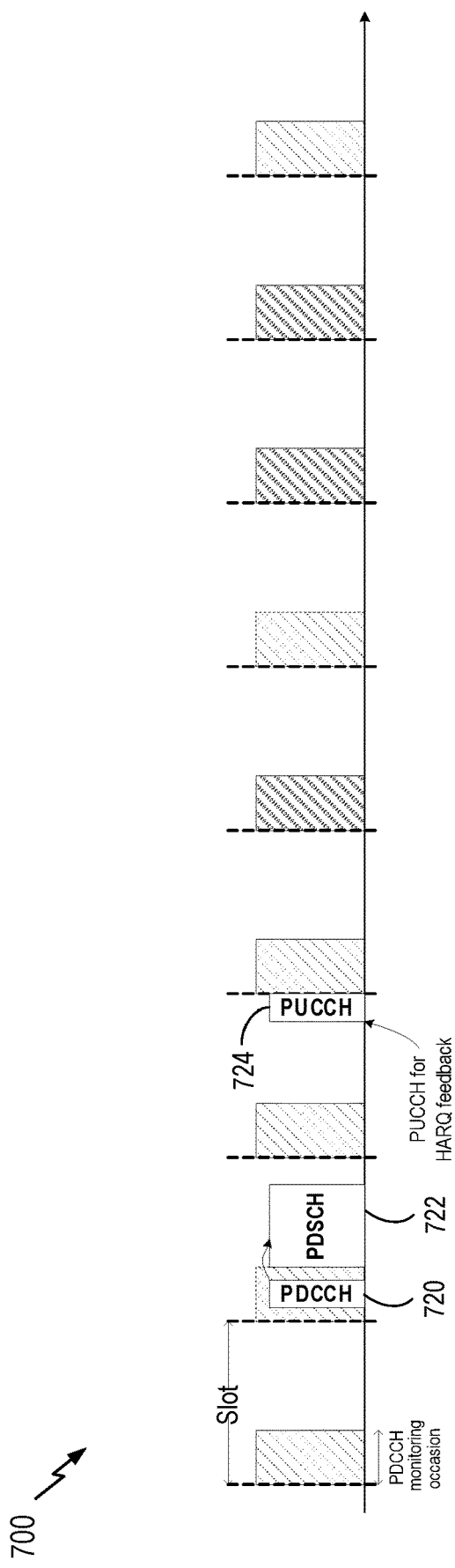
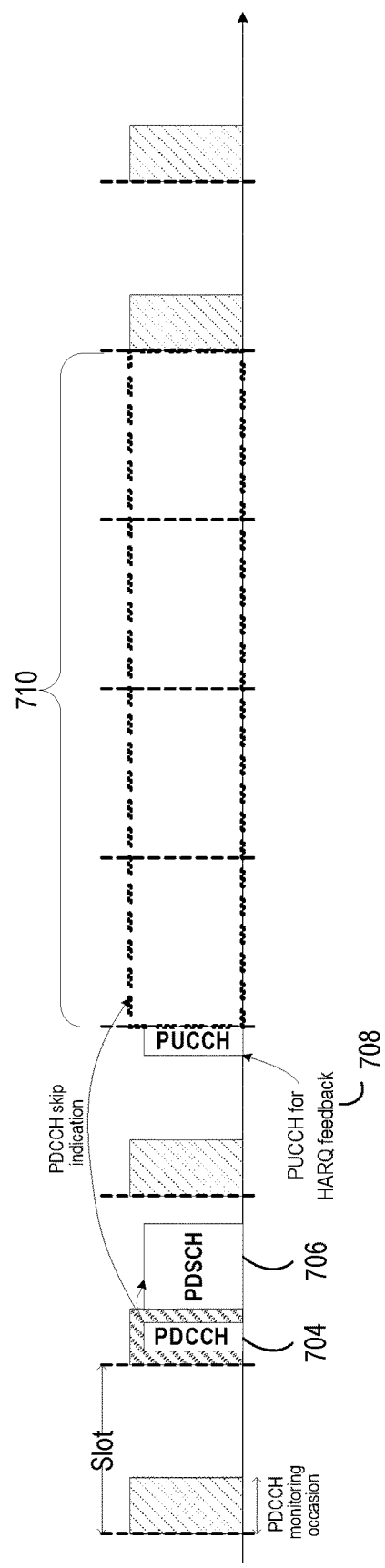
FIG. 7A
FIG. 7B

BEAM FAILURE RECOVERY SEARCH SPACE SET MONITORING ENHANCEMENTS

BACKGROUND

Field of the Disclosure

Aspects of the present disclosure relate to wireless communications, and more particularly, to techniques for beam failure recovery (BFR) search space (SS) set monitoring enhancements.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving, from a network entity, configuration information comprising at least one of a physical downlink control channel (PDCCH) monitoring skipping configuration or a search space (SS) set group (SSSG) switching configuration; detecting a beam failure of a beam used for communicating with the network entity; and in response to the detected beam failure, taking one or more actions to monitor a beam failure recovery (BFR) SS set for a BFR response from the network entity based, in part, on the configuration information.

Another aspect provides a method for wireless communications by a network entity. The method includes transmitting, to a UE, configuration information comprising at least one of a PDCCH monitoring skipping configuration or a SSSG switching configuration; detecting a beam failure of a beam used for communicating with the UE; and in response to the detected beam failure, transmitting a BFR response in a BFR SS set based on the configuration information.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIGS. 7A and 7B depict a diagram illustrating an example of physical downlink control channel (PDCCH) skipping.

DETAILED DESCRIPTION

Figure 1:
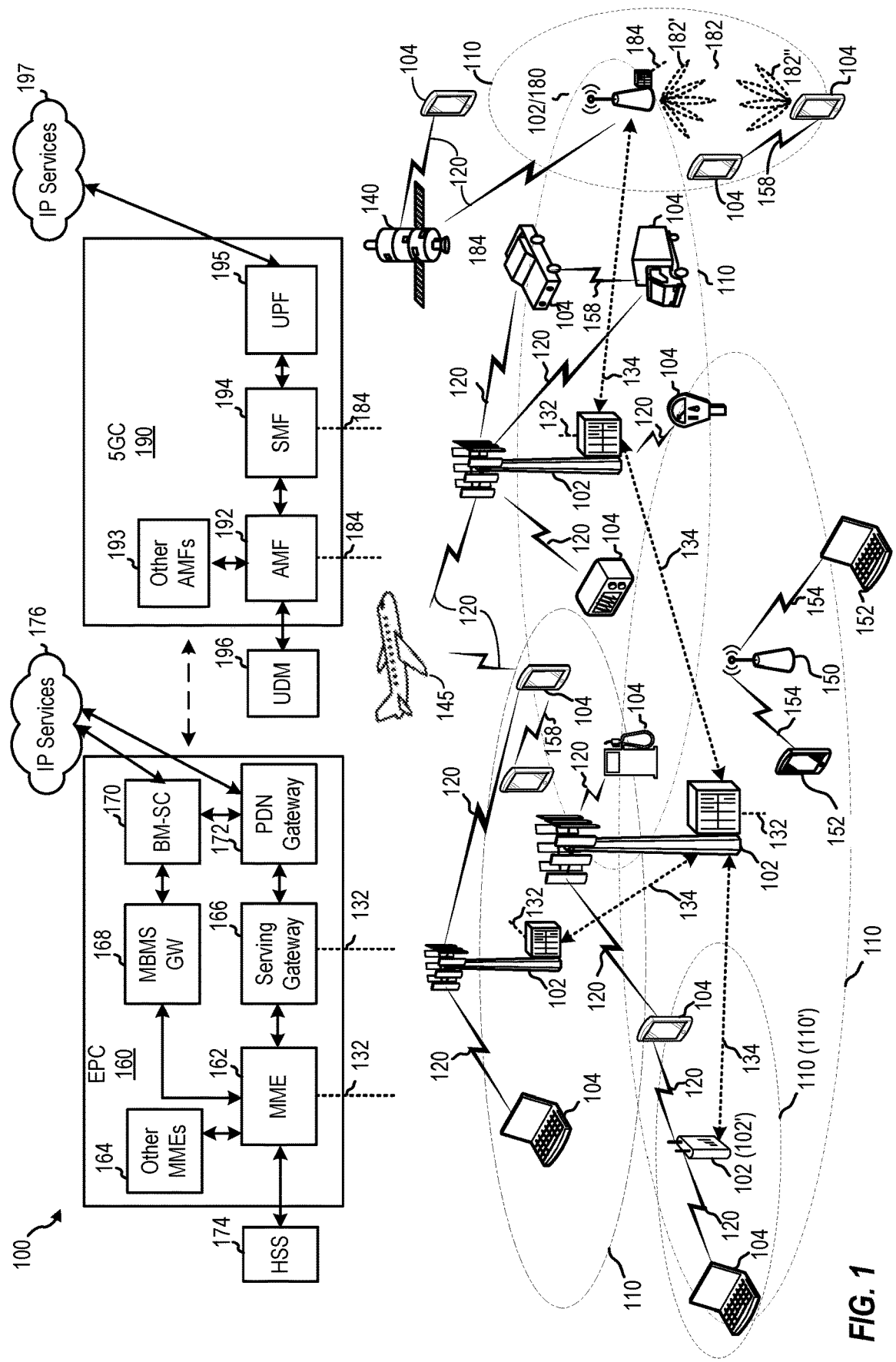
FIG. 1 depicts an example wireless communications network.

Aspects of the present disclosure provide apparatuses, methods, processing systems, and computer-readable mediums for beam failure recovery (BFR) search space (SS) set monitoring with physical downlink control channel (PDCCH) monitoring adaptation.

Advanced wireless systems (e.g., 5G NR) utilize higher frequencies (e.g., mmWave) with numerous antennas to perform beamforming. Beamforming generally refers to signal processing techniques that allows a network entity (e.g., a base station) to transmit using directional beams that target an intended recipient (e.g., a UE). Beamforming may help make efficient use of frequency resources by reducing interference by controlling transmit directions.

A radio link between a UE and gNB is susceptible to blockage and degradation of RF signal which can suddenly interrupt the communication link, resulting in beam failure. To detect a beam failure, a UE typically monitors physical downlink control channel (PDCCH) for beam failure detection (BFD) reference signals (RSs), which are part of a beam failure recovery (BFR) search space (SS) set, and determines whether a beam failure trigger condition is satisfied (e.g., based on defined criteria). If a beam failure is detected, a BFR process may be performed to try to recover the failed beam. The BFR procedure may involve selection of a best beam (e.g., SSB or CSI-RS), a BFR request (BFRQ), and a BFR response. The beam recovery happens when the UE performs random access channel (RACH), based on a BFR configuration received in a radio resource control (RRC) message, on the best candidate beam selected during the BFR procedure.

PDCCH monitoring adaptations may be used to provide advantages for particular use cases. For example, one type of PDCCH monitoring adaption is known as SS set group (SSSG) switching. SSSG switching involves switching between monitoring at least a first SSSG and a second SSSG and may be used to improve the frequency of channel access opportunities. Another type of PDCCH monitoring adaption is known as PDCCH skipping. PDCCH skipping involves skipping monitoring a configured PDCCH control search space for either a certain duration or until an indication is received to re-activate PDCCH monitoring and may be used to decrease power consumption and improve efficiency.

In some cases, issues may arise with the BFR procedure when PDCCH monitoring adaptations are enabled. PDCCH monitoring adaptions may hinder the efficacy of existing BFR procedures. For example, because PDCCH skipping configures a UE to skip monitoring for a PDCCH for a skip duration, when a BFR procedure is triggered, there may be cases in which the UE is not monitoring the BFR SS, causing the UE to not receive a BFR response and the BFR procedure to fail (e.g., radio link failure). Similarly, when SSSG switching is enabled, a current SSSG (i.e., the SSSG that is currently being monitored) may not include the BFR SS set, causing the UE to not receive a BFR response and the BFR procedure to fail. Failure of the BFR procedure is associated with a number of negative ramifications, including decreased efficiency, wasted time/frequency resources and wasted power associated with additional attempts of the BFR procedure.

Accordingly, aspects of the present disclosure provide techniques for configuring PDCCH monitoring adaptations, such as PDCCH skipping or SSSG switching, without reducing the efficacy or reliability of BFR procedures. For example, in some cases, the techniques presented herein may involve configuring PDCCH monitoring adaptation such that a BFR SS set may always be monitored by a UE, regardless of a current SSSG (e.g., even if the current SSSG does not contain the BFR SS set) and regardless of whether the UE is in a skip duration associated with PDCCH monitoring. Accordingly, by allowing the UE to monitor the BFR SS set regardless of whether a current SSSG includes the BFR SS set and regardless of whether the UE is in a skip duration associated with PDCCH monitoring, the possibility that the UE misses reception of a BFR response may be reduced, thereby avoiding BFR procedure failure and the wasted time, frequency, and power resources described above.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
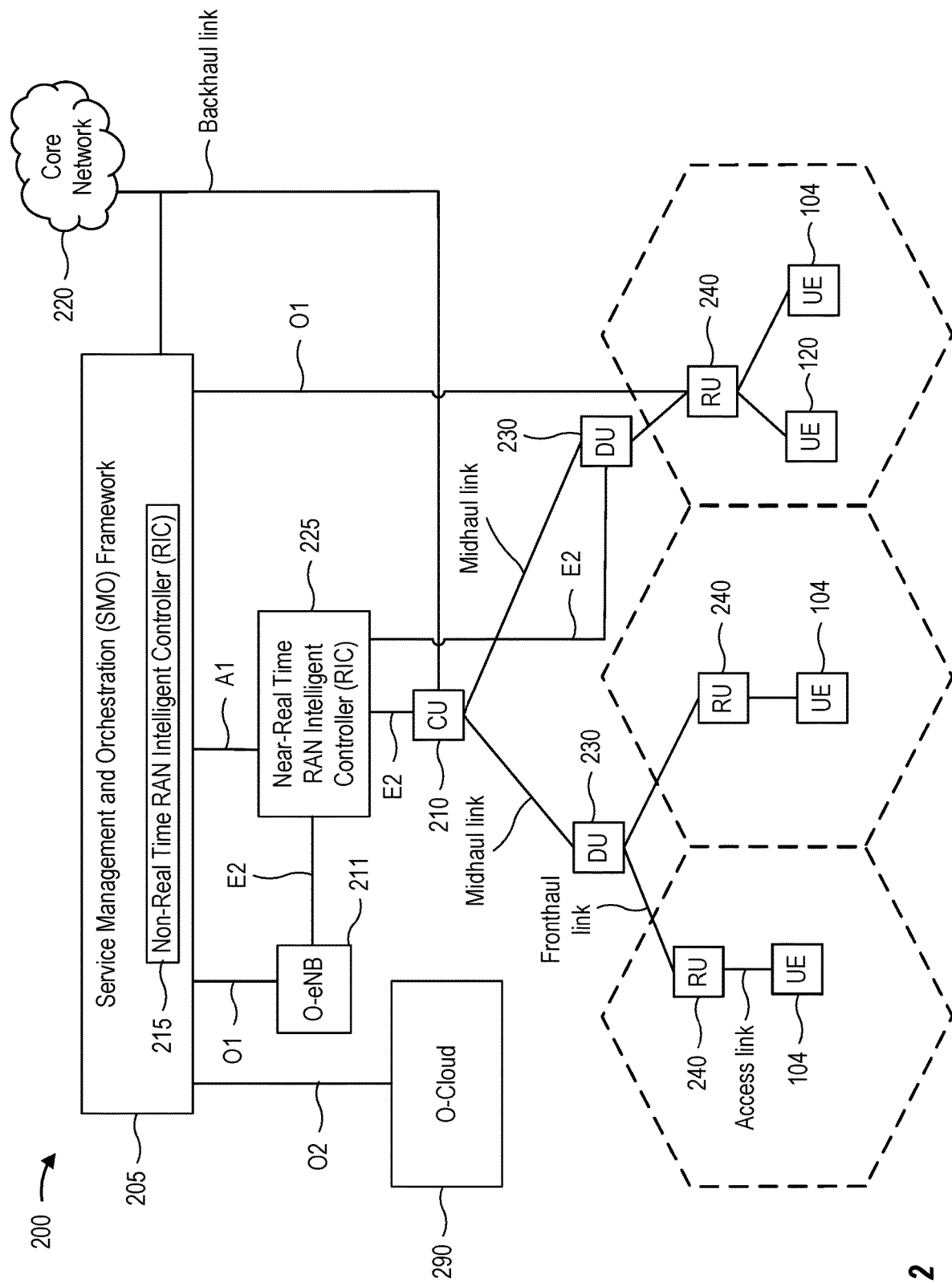
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
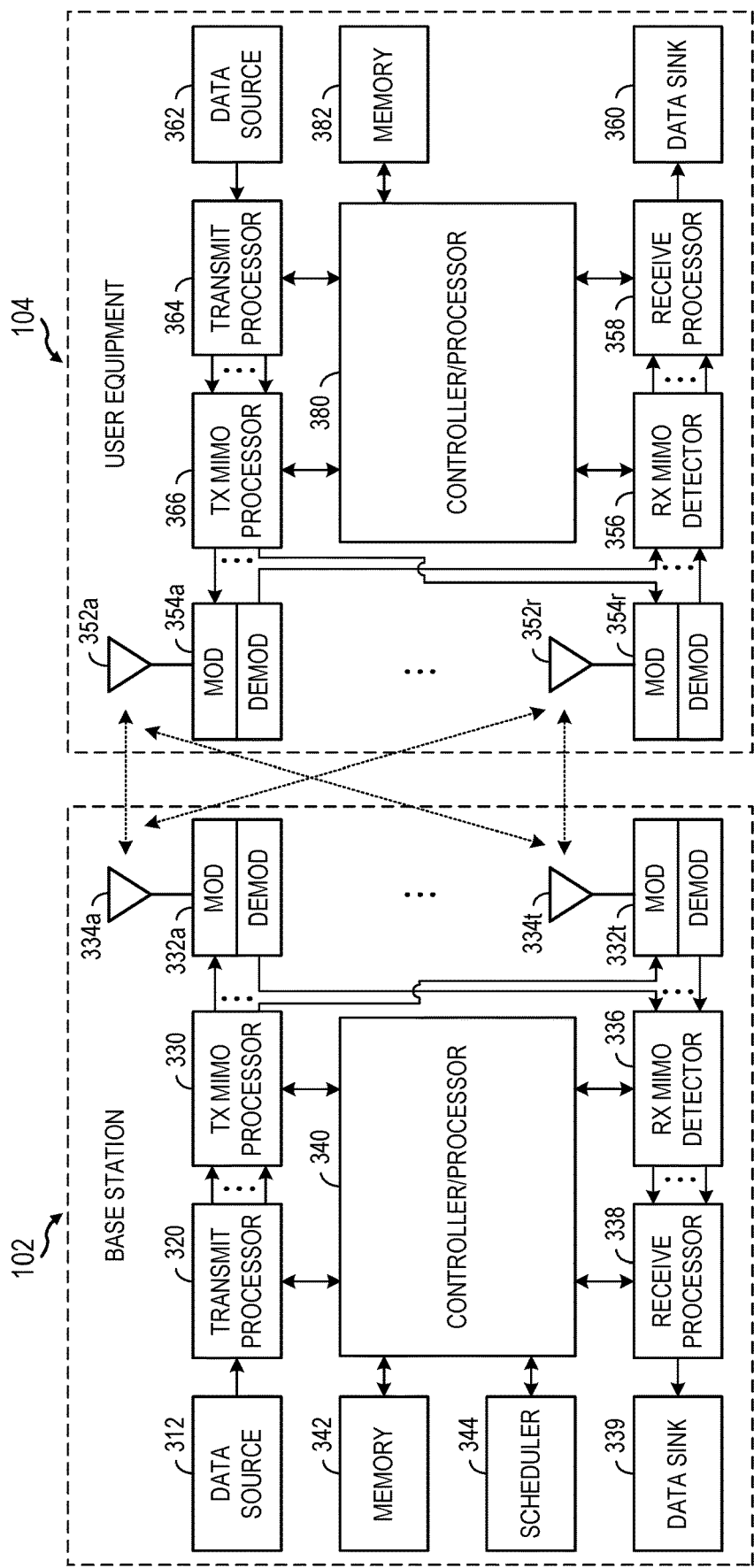
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Beam Failure Recovery Search Space Set Monitoring Enhancements In some cases, a user equipment (UE) (e.g., UE 104 of FIGS. 1 and 3) may communicate with a network entity (e.g., BS 102 of FIGS. 1 and 3 or a disaggregated base station described with respect to FIG. 2) using uplink (UL) transmission (TX) beams and downlink (DL) reception (RX) beams. In some cases, one or more of the DL RX or UL TX beams may fail and subsequent communication with the network entity using the failed beam(s) may not be possible. In such cases, the UE may perform a beam failure recovery (BFR) procedure to try to recovery or reestablish the failed beam(s).

Figure 5:
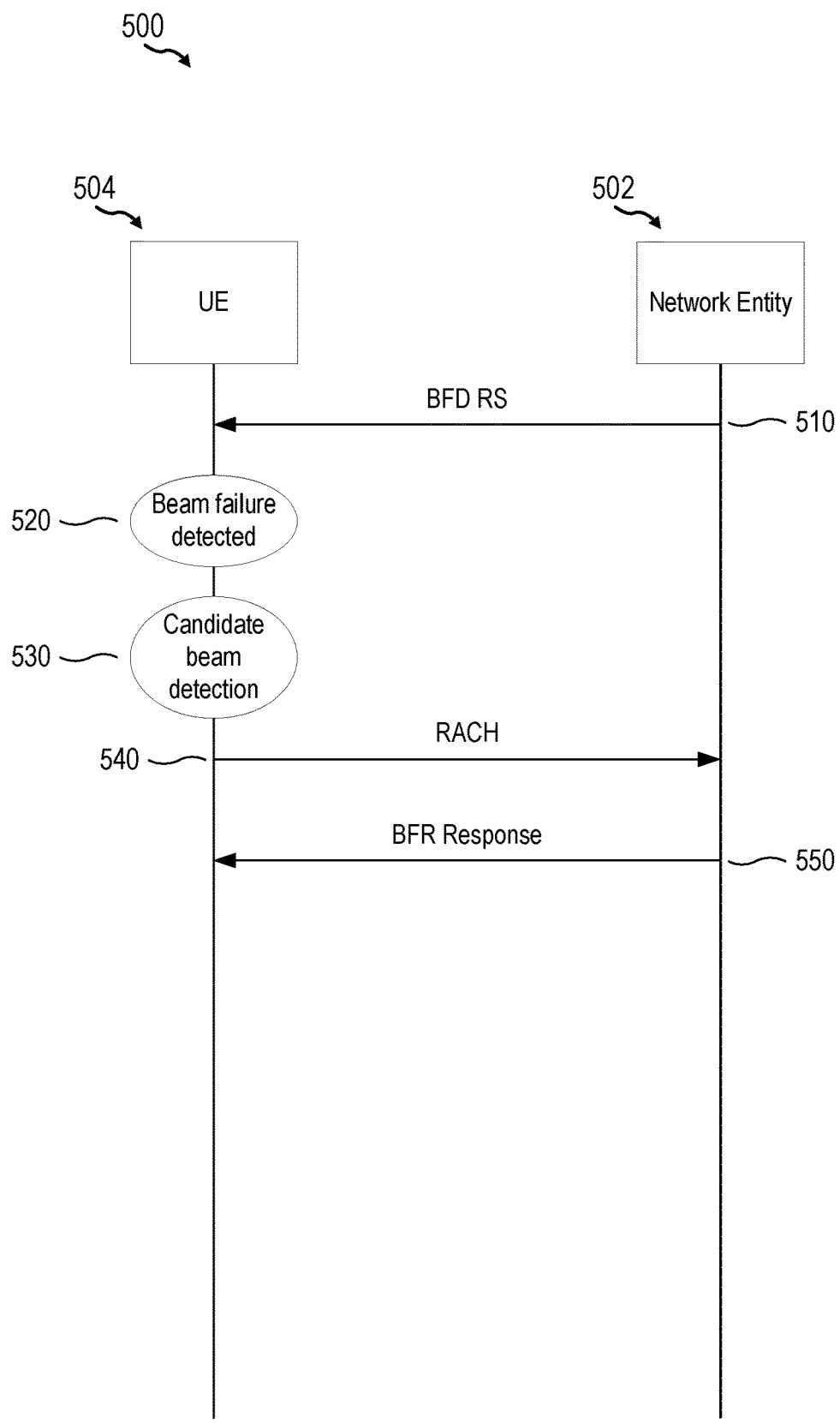
FIG. 5 depicts a call flow diagram illustrating a conventional beam failure recovery (BFR) procedure.

FIG. 5 depicts a call flow diagram illustrating example operations 500 for a conventional BFR procedure that may be performed to recover a failed beam used for communicating between network entity 502 and UE 504. In some cases, the network entity may be associated with a primary cell (Pcell) or a primary secondary cell group (SCG) cell (PScell). In some cases, the network entity 502 is an example of the BS 102 of FIGS. 1 and 3 or a disaggregated base station described with respect to FIG. 2.

In some cases, the UE 504 may receive the RRC parameter failureDetectionResources from the network entity that configures the UE 504 with a beam failure detection (BFD) resource set for detecting a beam failure. In some cases, the BFD resource set includes resources used by the network entity 502 to transmit BFD reference signals (RSs) that may be monitored by the UE 504 to determine whether a beam failure trigger condition has been met. In some cases, the BFD RSs may be synchronization signal blocks (SSBs) and/or a channel state information-reference signals (CSI-RSs) configured for beam management.

For example, each BFD RS in the BFD resource set may be associated with a particular transmit beam. When the network entity 502 transmits a BFD RS to the UE 504, as shown in step 510, a physical layer in the UE 504 may use the BFD RSs indicated in the BFD resource set to assess a radio link quality associated with the particular transmit beam against a threshold, $Q_{out}$. If the radio link quality is worse than $Q_{out}$ for all BFD RSs in the BFD resource set, an out-of-sync indication may be provided to higher layers of the UE 504. In some cases, for example, a beam failure associated with the particular transmit beam may be triggered, as shown at step 520, if a number of consecutive out-of-sync indications exceed a threshold maximum value.

As illustrated in step 530, the UE 504 performs a candidate beam detection (CBD) procedure to select a candidate beam to use for communicating with the network entity 502. In some cases, the CBD procedure may be based on an SSB or periodic CSI-RS configured by the RRC parameter, candidateBeamRSList. For example, the RRC parameter, candidateBeamRSList, may indicate a list of candidate beams that the UE 504 may select from upon BFD. In some cases, the UE 504 may identify the list of candidate beams prior to or in parallel with BFD. Further, once BFD has occurred (e.g., the UE 504 detects the beam failure), as part of the CBD procedure, the UE 504 may be configured to select, from the candidateBeamRSList, an RS index ($q_{new}$) for a candidate beam that has a reference signal receive power (RSRP) measurement greater than or equal to a configurable threshold, $Q_{in}$. Thereafter, once the RS index is selected, UE 504 initiates a contention free random access channel (RACH) procedure and transmits, in step 540, a random access resource (RA-preamble-index) associated with the selected RS index and candidate beam.

Thereafter, as illustrated in step 550, the network entity 502 transmits a BFR response to the UE 504 in response to receiving the random access resource (RA-preamble-index). In some cases, to receive the BFR response, the UE 504 monitors, starting from slot n+4, a physical downlink control channel (PDCCH) in a search space (SS) set provided by recoverySearchSpaceID for a downlink control information (DCI) format with cyclic redundancy check (CRC) scrambled by a cell radio network temporary identifier (C-RNTI) or a modulation coding scheme (MCS)-C-RNTI.

In some cases, if the UE receives the PDCCH within a time window, the BFR procedure is complete. In some cases, a control resource set (CORESET) associated with the SS set provided by recoverySearchSpaceID may not be used for any other SS set. For PDCCH monitoring in an SS set provided by recoverySearchSpaceID, and for corresponding physical downlink shared channel (PDSCH) reception, the UE 504 may assume the same quasi colocation (QCL) parameters as the QCL parameters associated with the RS index $q_{new}$ until the UE 504 receives an activation signal from higher layers for a transmission configuration indicator (TCI) state for any of the parameters TCI-StatesPDCCH-ToAddlist parameter and/or TCI-StatesPDCCH-ToReleaseList.

In unlicensed band operation, network entities may only start transmitting control information and data after acquiring a channel and while UEs are monitoring control (e.g., PDCCH). In some cases, a channel may be acquired via a listen-before-talk (LBT) procedure. Instead of risking losing the medium associated with the channel by waiting for a next slot boundary to start transmitting, a network entity may be able to increase the frequency of channel access opportunities by configuring a UE to perform mini-slot based control monitoring. However, within a channel occupancy time (COT), frequent mini-slot based control monitoring by the UE may not be necessary.

In some cases, the mechanism for PDCCH monitoring may be adapted to be dynamic for improved functionality, known as PDCCH monitoring adaption. One type of PDCCH monitoring adaptation includes SS set group (SSSG) switching. When configured with SSSG switching, the UE may be provided with at least two SSSGs and configured to switch between monitoring each of the at least two SSSGs based on explicit or implicit signals. Utilizing SSSG switching provides significant advantages when it comes to power savings, flexibility of PDCCH monitoring, and frequency of channel access opportunities. In some cases, for example, a network may configure numerous SSSGs for each UE, and monitoring periods of different search spaces may be different. As will be discussed in greater detail below, some SSSGs may be used for sparse PDCCH monitoring, while others may be used for more frequent PDCCH monitoring, decreasing total power consumption.

Figure 6:
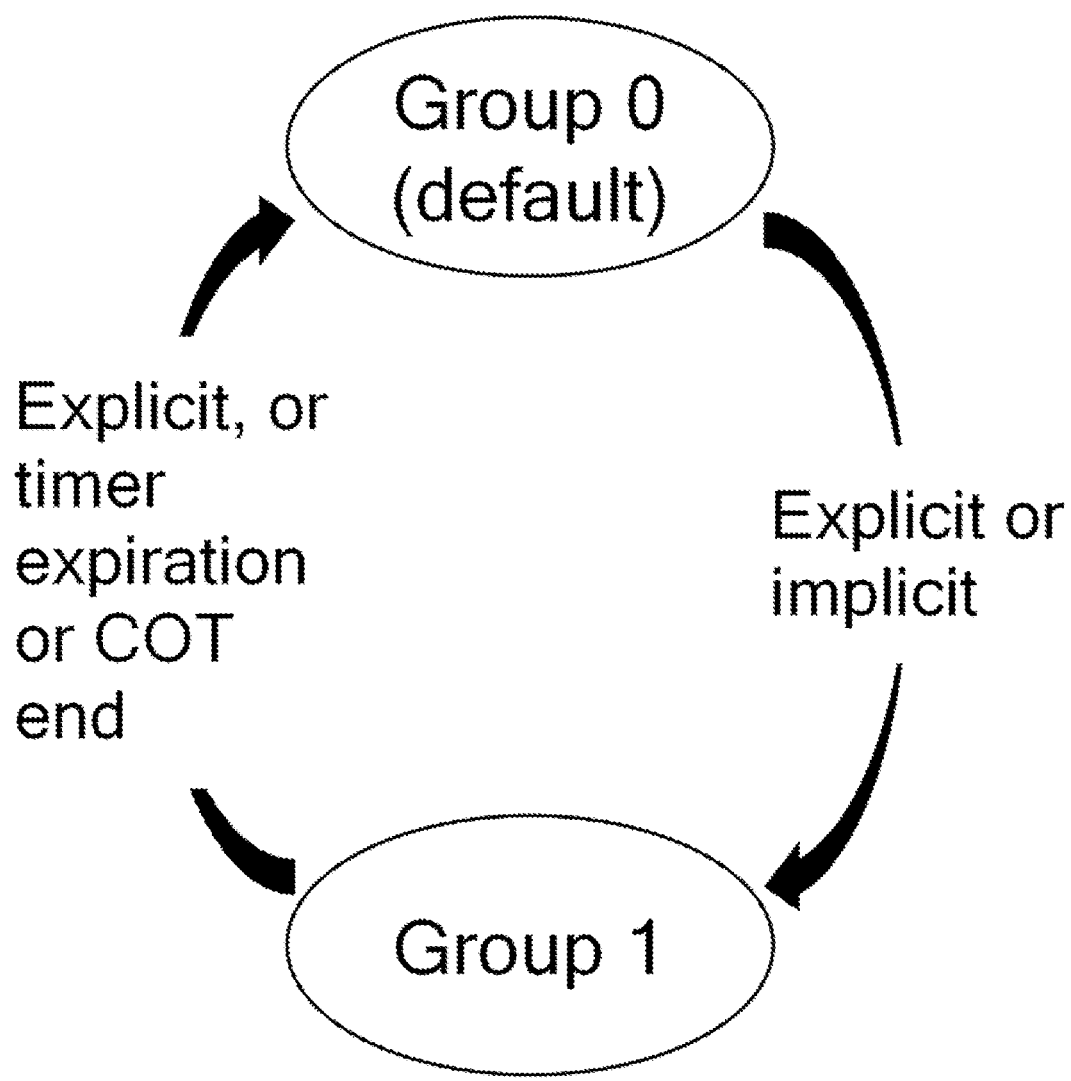
FIG. 6 depicts a diagram illustrating an example of search space (SS) set group (SSSG) switching.

FIG. 6 depicts a diagram 600 illustrating an example of SSSG switching. As illustrated in the diagram 600, a UE (e.g., UE 104, UE 504, etc.) may be provided with at least two SSSGs, such as Group 0 and Group 1. In some cases, a Group 0 may be associated with out-of-gNB COT and a Group 1 may be associated with inside-gNB COT. In some cases, Group 0 may be a default SSSG.

As illustrated in diagram 600, the UE may switch between the at least two SSSGs. The switching mechanism may be explicit, for example, based on a bit in DCI (e.g., DCI format 2_0). In some cases, the switching mechanism may be implicit (e.g., based on PDCCH decoding) with the assistance of COT duration information or the expiration of an automatic fallback timer. For example, a UE may switch from group 1 to group 0 when it receives an explicit indication, when a timer expires, or when a COT ends.

In some cases, SSSG switching may be used for licensed band operation for UE power savings. For example, in some cases, Group 0 may be used for sparse PDCCH monitoring for increased power savings. In such cases, Group 1 may be used for more frequent PDCCH monitoring for improved performance (e.g., high throughput, low latency, etc.).

Another type of PDDCH monitoring adaptation is PDCCH monitoring skipping. PDCCH skipping involves skipping monitoring a configured PDCCH control search space for either a certain duration or until an indication is received to re-activate PDCCH monitoring. PDCCH skipping may be used with significant advantages when PDCCH monitoring is not necessary for a duration (e.g., a number, N, of slots). For example, PDCCH skipping can significantly decrease total power consumption and improve efficiency. An example of PDCCH monitoring skipping is described with respect to FIGS. 7A and 7B, below.

In 5G/NR networks, UEs monitor for control signaling (e.g., uplink and downlink grants) conveyed in PDCCHs. PDCCHs are transmitted at certain times referred to as PDCCH monitoring occasions (MOs). FIG. 7A illustrates an example of PDCCH MOs. As illustrated, a PDCCH MO may occur at the beginning of a slot. If the UE is in a low power state, such as a discontinuous reception (DRX) state with some RF resources powered down, the UE typically wakes up (e.g., in a DRX ON duration) from the low power state to monitor for PDCCH transmissions sent in the PDCCH MOs. If a PDCCH is not detected, the UE may go back to sleep (e.g., a DRX Off duration).

In the illustrated example, a PDCCH 720 is transmitted in the second slot. The PDCCH 720 schedules a downlink transmission 722 (PDSCH). The UE then sends acknowledgment (ACK) feedback 724 (indicating whether the scheduled PDSCH was successfully received or not) in a physical uplink control channel (PUCCH).

As indicated above, in many typical operational scenarios of NR modems (e.g., smart phone use cases), the process of monitoring for PDCCHs alone accounts for a significant amount of power consumption. Therefore, in some cases, to save power, dynamic skipping of PDCCH monitoring occasions may be considered.

FIG. 7B depicts a diagram illustrating an example of physical downlink control channel (PDCCH) skipping. As shown at 702, a UE may be signaled an indication to skip PDCCH monitoring for a certain duration of time. In the illustrated example, the indication is transmitted with a PDCCH 704 scheduling a PDSCH 706. For example, a bit field in a scheduling DCI conveyed in the PDCCH may indicate a skip duration. As illustrated, the skip duration 710 may begin after the PUCCH 708 carrying acknowledgement (ACK) feedback for the PDSCH 706.

As noted above, a scheduling DCI (e.g., format 0_1/0_2/1_1/1_2) may indicate PDCCH skipping along with PDSCH/PUSCH scheduling. In some cases, a field (e.g., up to 2-bit field) may be configured in a scheduling DCI for the indication. The skip duration may be indicated in different granularities. For example, the skip duration may indicate the UE is to skip PDCCH monitoring for the next N slots, for the next N PDCCH MOs, or until the start of a next DRX cycle.

For various applications, such as deployments with multiple transmitter receiver points (multi-TRP), PDCCH repetition may be configured to enhance reliability. In such cases, at least two PDCCH MOs (possibly associated with different SS sets and CORESETs) may be paired for the PDCCH repetitions.

In some cases, these PDCCH monitoring adaptations may present certain issues with the BFR procedure described above. For example, a PDDCH monitoring adaptation may cause a BFR SS set to not be monitored in time when BFR is triggered. As such, PDCCH monitoring adaptions may hinder the efficacy of existing BFR procedures. For example, because PDCCH skipping configures a UE to skip monitoring a PDCCH for a skip duration, when a BFR procedure is triggered, there may be cases in which the UE is not monitoring the BFR SS. As a result, when BFR is triggered during a PDCCH skip duration, monitoring of the BFR SS set may be delayed until the end of the skip duration. This may cause the UE to not receive a BFR response and the BFR procedure to fail (e.g., causing a radio link failure). Similarly, when SSSG switching is enabled, a current SSSG (e.g., the SSSG that is currently being monitored) may not include the BFR SS set. This may lead to a scenario where the UE does not receive a BFR response from the network entity because the BFR SS set in which the BFR response is transmitted is not included in the SSSG monitored by the UE, causing the BFR procedure to fail.

A failure of the BFR procedure may require additional attempts at performing the BFR procedure, causing the UE to consume a significant amount of power and time-frequency resources associated with selecting new candidate beams, retransmitting RACH, and monitoring for BFR responses (which the UE may never receive due to the PDCCH monitoring adaptions described above). Moreover, user experience is negatively impacted due to the latency associated with having to re-perform the BFR procedure. Moreover, if the UE is unable to recover the failed beam after a certain number of attempts, a radio link failure (RLF) may be declared, causing the UE to search for a new cell to connect to, increasing the amount of power and time-frequency resources unnecessarily consumed by the UE.

Accordingly, aspects of the present disclosure provide techniques for improving BFR SS set monitoring when PDCCH monitoring adaptations, such as PDCCH skipping or SSSG switching, are enabled.

For example, in some cases, the techniques presented herein may involve configuring PDCCH monitoring adaptations such that a BFR SS set may be monitored by the UE unconditionally. For example, in the case of SSSG switching, the BFR SS set may be monitored regardless of a current SSSG. In other words, the UE may be configured to monitor the BFR SS set even if the current SSSG does not contain the BFR SS set. Further, in the case of PDCCH monitoring skipping, the BFR SS set may be monitored regardless of configured PDCCH monitoring skip durations. Thus, even if the UE is currently in a skip duration, the BFR SS set may be monitored. Accordingly, by allowing the UE to monitor the BFR SS set regardless of whether a current SSSG includes the BFR SS set and regardless of whether the UE is in a skip duration associated with PDCCH monitoring, the possibility that the UE misses reception of a BFR response may be significantly reduced, thereby avoiding BFR procedure failure and the wasted time, frequency, and power resources described above.

In some cases, the techniques presented herein may involve configuring PDCCH monitoring adaptations such that a BFR SS set may be monitored by a UE, conditionally, after the UE transmits a random access preamble for BFR. For example, after the UE transmits the random access preamble for BFR, the UE may monitor the BFR SS set regardless of whether a current SSSG includes the BFR SS set and regardless of whether the UE is in a skip duration associated with PDCCH monitoring, as described above.

In some cases, the techniques presented herein may involve configuring a designated SSSG as a default SSSG. In such cases, the configuration may always include the BFR SS set in the default SSSG. Thus, even in a scenario where BFR is triggered when the UE is in a non-default SSSG which does not include the BFR SS set, the UE may fall back to the default SSSG, which includes the BFR SS set, when an SSSG timer expires. In some cases, after transmitting a random access preamble for BFR, a UE may be capable of autonomously switching to the default SSSG before the SSSG timer expires. This may expedite the BFR procedure, improving efficiency and reliability in particular situations. Additional aspects regarding these techniques are presented below with respect to FIG. 8.

Example Operations of Entities in a Communications Network

Figure 8:
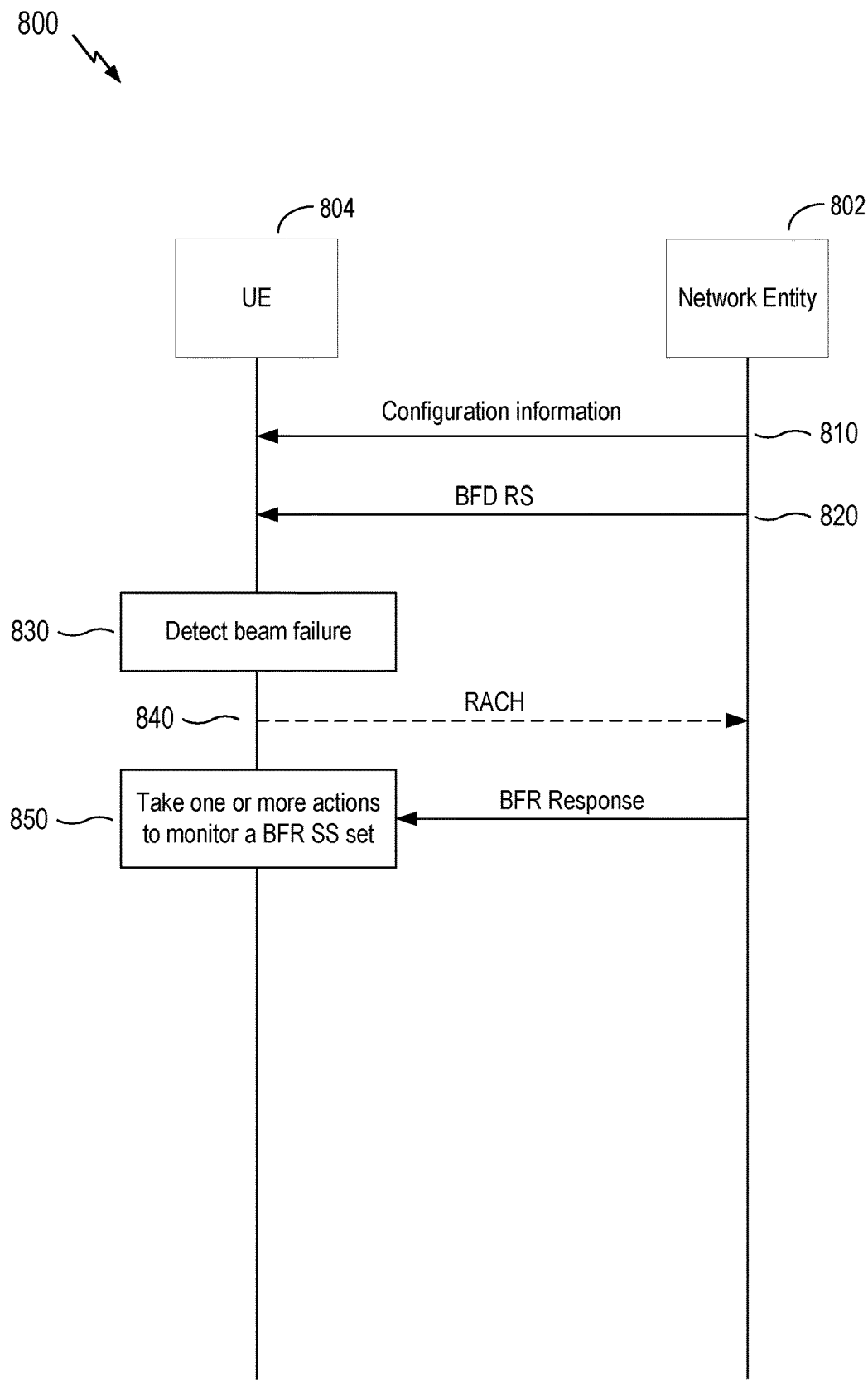
FIG. 8 depicts a call flow diagram, in accordance with aspects of the present disclosure.

FIG. 8 depicts a call flow diagram illustrating operations 800 for communications in a network between a network entity 802 and a UE 804, in accordance with aspects of the present disclosure. In some aspects, the UE 804 may be an example of UE 104 depicted and described with respect to FIGS. 1 and 3. In some aspects, the network entity 802 may be an example of BS 102 depicted and described with respect to FIGS. 1 and 3 or a disaggregated base station depicted and described with respect to FIG. 2.

As shown, operations 800 begin in step 810 with the network entity 802 transmitting configuration information to UE 804. In some cases, the configuration information comprises at least one of a PDCCH monitoring skipping configuration or an SSSG switching configuration. In some cases, when the configuration information includes the PDCCH monitoring skipping configuration, the PDCCH monitoring skipping configuration may configure the UE 804 to skip PDCCH monitoring for a skip duration.

In some cases, when the configuration information includes the SSSG switching configuration, the SSSG switching configuration configures the UE 804 to switch between monitoring a first SSSG and monitoring a second SSSG. In some cases, the configuration information includes an indication of the first SSSG to monitor and the second SSSG to monitor. In some cases, the configuration information further includes an indication of an SSSG timer for triggering a switch from the non-default SSSG to the default SSSG based on the detected beam failure.

In some cases, the configuration information (e.g., which may include the RRC parameter failureDetectionResources) may configure the UE 804 with a BFD resource set for detecting a beam failure. In some cases, the BFD resource set includes resources used by the network entity 802 to transmit BFD RSs that may be monitored by the UE 804 to determine whether a beam failure trigger condition has been met. In some cases, the BFD RSs may be SSBs and/or a CSI-RSs configured for beam management. For example, each BFD RS in the BFD resource set may be associated with a particular transmit beam.

Thereafter, in step 820 of FIG. 8, the network entity 802 transmits a BFD RS to the UE 804. As described above, a physical layer in the UE 804 may use the BFD RSs indicated in the BFD resource set to assess a radio link quality associated with the particular transmit beam against a threshold, $Q_{out}$. If the radio link quality is worse than $Q_{out}$ for all BFD RSs in the BFD resource set, an out-of-sync indication may be provided to higher layers of the UE 804. In some cases, for example, a beam failure associated with the particular transmit beam used for communicating with the network entity 802 may be detected and triggered, in step 830, if a number of consecutive out-of-sync indications exceed a threshold maximum value. In some cases, detecting the beam failure comprises detecting the beam failure while monitoring the non-default SSSG.

Thereafter, in step 840 of FIG. 8, in response to detecting the beam failure, the UE 804 optionally transmits a RACH to the network entity 802 (e.g., including a random access preamble) associated with one or more selected candidate beams (e.g., similar to steps 530 and 540 of FIG. 5) for BFR.

Additionally, as shown in step 850 of FIG. 8, in response to detecting the beam failure, the UE 804 takes one or more actions to monitor a BFR SS set for a BFR response from the network entity 802 based, in part, on the configuration information.

In some cases, to avoid the issues described above that arise when monitoring for a BFR response when PDCCH monitoring adaptions are enabled (e.g., via the configuration information), the BFR SS set monitoring by the UE 804 may be configured to not be affected by the PDCCH monitoring adaption. In some cases, the UE 804 may monitor the BFR SS set in different manners, such as unconditional monitoring and conditional monitoring.

In some cases, for unconditional monitoring, the UE 804 may be configured to always monitor the BFR SS set regardless of whether PDCCH skipping is configured. In such cases, taking the one or more actions in step 850 may include monitoring the BFR SS set for the BFR response regardless of whether the UE 804 is skipping the PDCCH monitoring for the skip duration according to the PDCCH monitoring skipping configuration.

Additionally, for unconditional monitoring, the UE 804 may be configured to always monitor the BFR SS set regardless of the current SSSG being monitored by the UE 804. For example, as noted above, the SSSG switching configuration configures the UE 804 to switch between monitoring a first SSSG and monitoring a second SSSG. Accordingly, for unconditional monitoring, taking the one or more actions in step 850 comprises monitoring the BFR SS set for the BFR response regardless of which of the first SSSG or the second SSSG is being monitored by the UE 804 according to the SSSG switching configuration.

In some cases, for conditional monitoring, the UE 804 may be configured to monitor the BFR SS set based on a certain condition or trigger being satisfied, such as a random access preamble for BFR having been transmitted by the UE 804. For example, in some cases, after transmitting the random access preamble (e.g., in step 840), the UE 804 may be configured to monitor the BFR SS set regardless of whether PDCCH skipping is configured. Accordingly, taking the one or more actions in step 850 may include transmitting a random access preamble (e.g., in step 840) in response to detecting the beam failure and monitoring, after transmitting the random access preamble, the BFR SS set for the BFR response regardless of whether the UE 804 is skipping the PDCCH monitoring for the skip duration according to the PDCCH monitoring skipping configuration.

Additionally, in some cases, for conditional monitoring, after transmitting the random access preamble (e.g., in step 840), the UE 804 may be configured to monitor the BFR SS set regardless of the current SSSG that is being monitored by the UE 804, even if the current SSSG does not contain the BFR SS set. For example, in some cases, the second SSSG configured by the SSSG switching configuration may not include the BFR SS set. In such cases, if the second SSSG set is currently being monitored by the UE 804 when the beam failure is detected, the UE 804 may still be configured to monitor the BFR SS set even though the BFR SS set is not included within the second SSSG set being monitored by the UE 804.

Accordingly, in some cases, for conditional monitoring, taking the one or more actions in step 850 may include transmitting a random access preamble in response to detecting the beam failure and monitoring, according to the SSSG configuration after transmitting the random access preamble, the BFR SS set for the BFR response regardless of which of the first SSSG or the second SSSG is being monitored by the UE 804.

In some cases, to help ensure that the UE 804 is able to monitor the BFR SS set when a beam failure is detected, the BFR SS set may be configured to always be within a designated SSSG, such as a default SSSG. Accordingly, if a beam failure is detected and BFR is triggered when UE 804 is monitoring a non-default SSSG that does not include the BFR SS set, the UE 804 may be configured to fall back to the default SSSG that includes the BFR SS set, such as when an SSSG timer expires.

For example, in some cases, the first SSSG configured by the SSSG switching configuration may be a default SSSG (e.g., Group 0 in FIG. 6) that includes the BFR SS set while the second SSSG may be a non-default SSSG (e.g., Group 1 in FIG. 6) that does not include the BFR SS set. In such cases, taking the one or more actions in step 850 may include starting an SSSG timer, switching to the default SSSG upon expiration of the SSSG timer, and monitoring the BFR SS set in the default SSSG after switching to the default SSSG.

In some cases, to expedite the BFR procedure, UE 804 may be allowed to autonomously switch to the default SSSG after transmitting a random access preamble for BFR, before the SSSG timer expires. In this case, taking the one or more actions in step 850 may include starting the SSSG timer, transmitting a random access preamble (e.g., in step 840) in response to detecting the beam failure, switching to the default SSSG after transmitting the random access preamble and prior to expiration of the SSSG timer, and monitoring the BFR SS set in the default SSSG after switching to the default SSSG.

Additionally, in some cases, to help ensure that the UE 804 is able to monitor the BFR SS set when a beam failure is detected, a BFR SS set may be configured for per SSSG as opposed to per bandwidth part (BWP). In other words, for example, one SS set from each of the first SSSG and the second SSSG may be configured as the BFR SS set. In this case, taking the one or more actions in step 850 may include, after detecting the beam failure, monitoring the one SS set in one of the first SSSG or the second SSSG (e.g., depending on which of the first SSSG or the second SSSG is currently being monitored by the UE 804 based on the SSSG switching configuration).

Example Operations of a User Equipment

Figure 9:
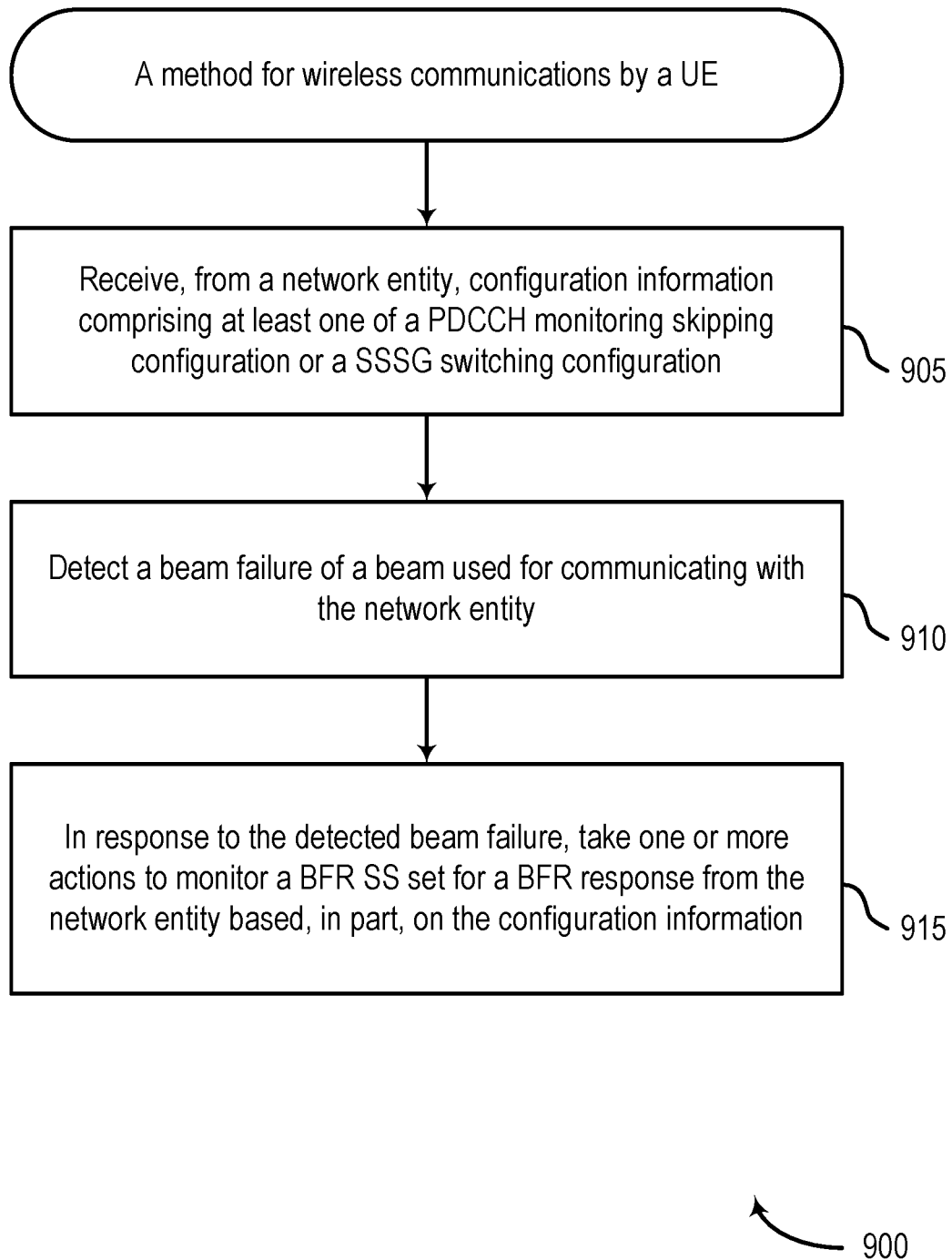
FIG. 9 depicts a method for wireless communications.

FIG. 9 shows an example of a method 900 for wireless communications by a UE, such as UE 104 of FIGS. 1 and 3.

Method 900 begins at step 905 with receiving, from a network entity, configuration information comprising at least one of a PDCCH monitoring skipping configuration or a SSSG switching configuration. In some cases, the operations of this step refer to, or may be performed by, circuitry for receiving and/or code for receiving as described with reference to FIG. 11.

Method 900 then proceeds to step 910 with detecting a beam failure of a beam used for communicating with the network entity. In some cases, the operations of this step refer to, or may be performed by, circuitry for detecting and/or code for detecting as described with reference to FIG. 11.

Method 900 then proceeds to step 915 with, in response to the detected beam failure, taking one or more actions to monitor a BFR SS set for a BFR response from the network entity based, in part, on the configuration information. In some cases, the operations of this step refer to, or may be performed by, circuitry for taking and/or code for taking as described with reference to FIG. 11.

In some aspects, the configuration information comprises the PDCCH monitoring skipping configuration configuring the UE to skip PDCCH monitoring for a skip duration.

In some aspects, taking the one or more actions comprises monitoring the BFR SS set for the BFR response regardless of whether the UE is skipping the PDCCH monitoring for the skip duration according to the PDCCH monitoring skipping configuration.

In some aspects, taking the one or more actions comprises: transmitting a random access preamble in response to detecting the beam failure; and monitoring, after transmitting the random access preamble, the BFR SS set for the BFR response regardless of whether the UE is skipping the PDCCH monitoring for the skip duration according to the PDCCH monitoring skipping configuration.

In some aspects, the configuration information comprises the SSSG switching configuration configuring the UE to switch between monitoring a first SSSG and monitoring a second SSSG.

In some aspects, the configuration information includes an indication of the first SSSG to monitor and the second SSSG to monitor.

In some aspects, the second SSSG does not include the BFR SS set.

In some aspects, taking the one or more actions comprises monitoring the BFR SS set for the BFR response regardless of which the first SSSG or the second SSSG is being monitored by the UE according to the SSSG switching configuration.

In some aspects, taking the one or more actions comprises: transmitting a random access preamble in response to detecting the beam failure; and monitoring, after transmitting the random access preamble, the BFR SS set for the BFR response regardless of which of the first SSSG or the second SSSG is being monitored by the UE according to the SSSG configuration.

In some aspects, the first SSSG is a default SSSG including the BFR SS set; and the second SSSG is a non-default SSSG that does not include the BFR SS set.

In some aspects, the configuration information further includes an indication of an SSSG timer for triggering a switch from the non-default SSSG to the default SSSG based on the detected beam failure.

In some aspects, detecting the beam failure comprises detecting the beam failure while monitoring the non-default SSSG.

In some aspects, taking the one or more actions comprises: starting the SSSG timer; switching to the default SSSG upon expiration of the SSSG timer; and monitoring the BFR SS set in the default SSSG after switching to the default SSSG.

In some aspects, taking the one or more actions comprises: starting the SSSG timer; transmitting a random access preamble in response to detecting the beam failure; switching to the default SSSG after transmitting the random access preamble and prior to expiration of the SSSG timer; and monitoring the BFR SS set in the default SSSG after switching to the default SSSG.

In some aspects, one SS set from each of the first SSSG and the second SSSG is configured as the BFR SS set; and taking the one or more actions comprises, after detecting the beam failure, monitoring the one SS set in one of the first SSSG or the second SSSG.

Figure 11:
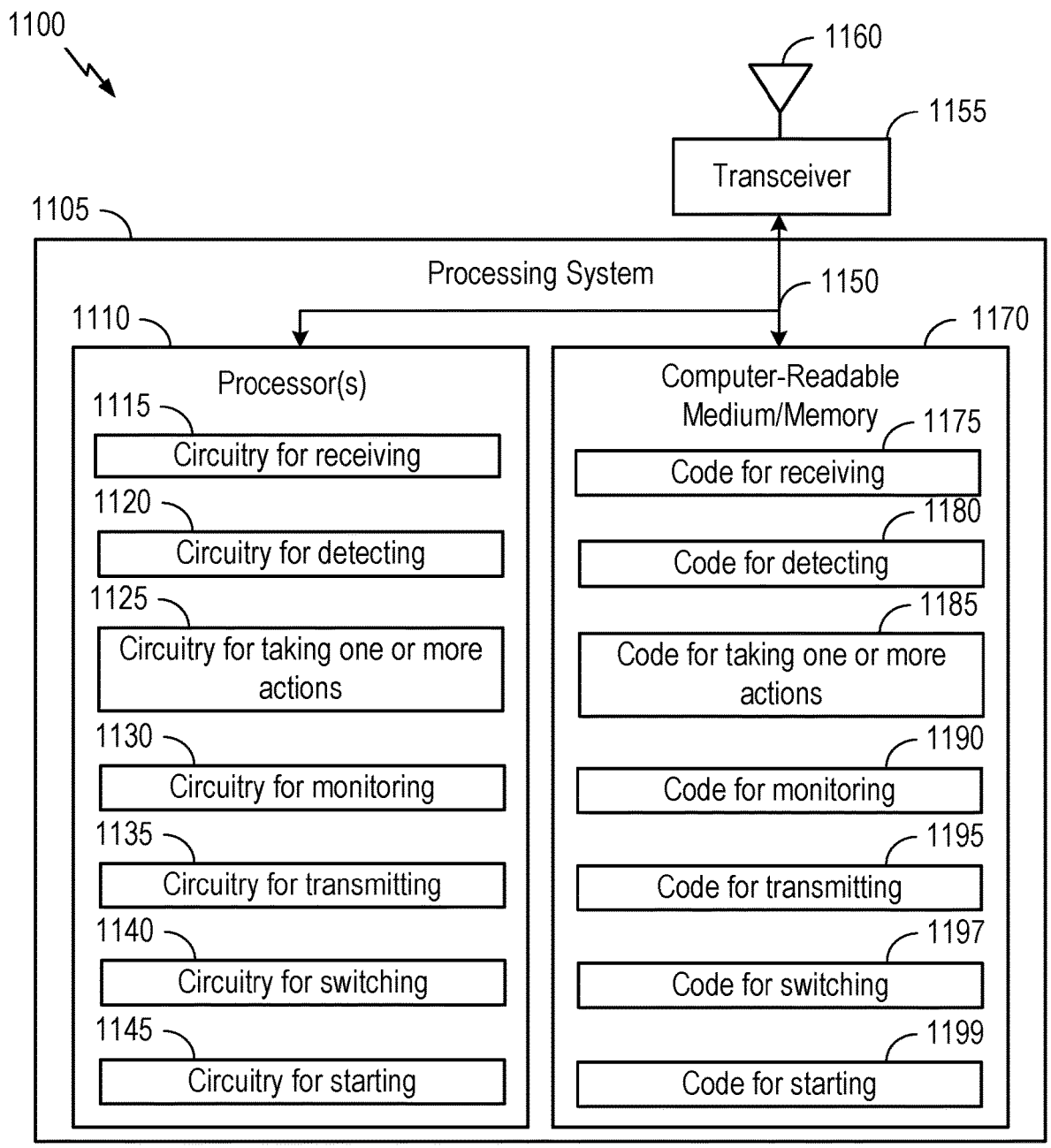
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Network Entity

Figure 10:
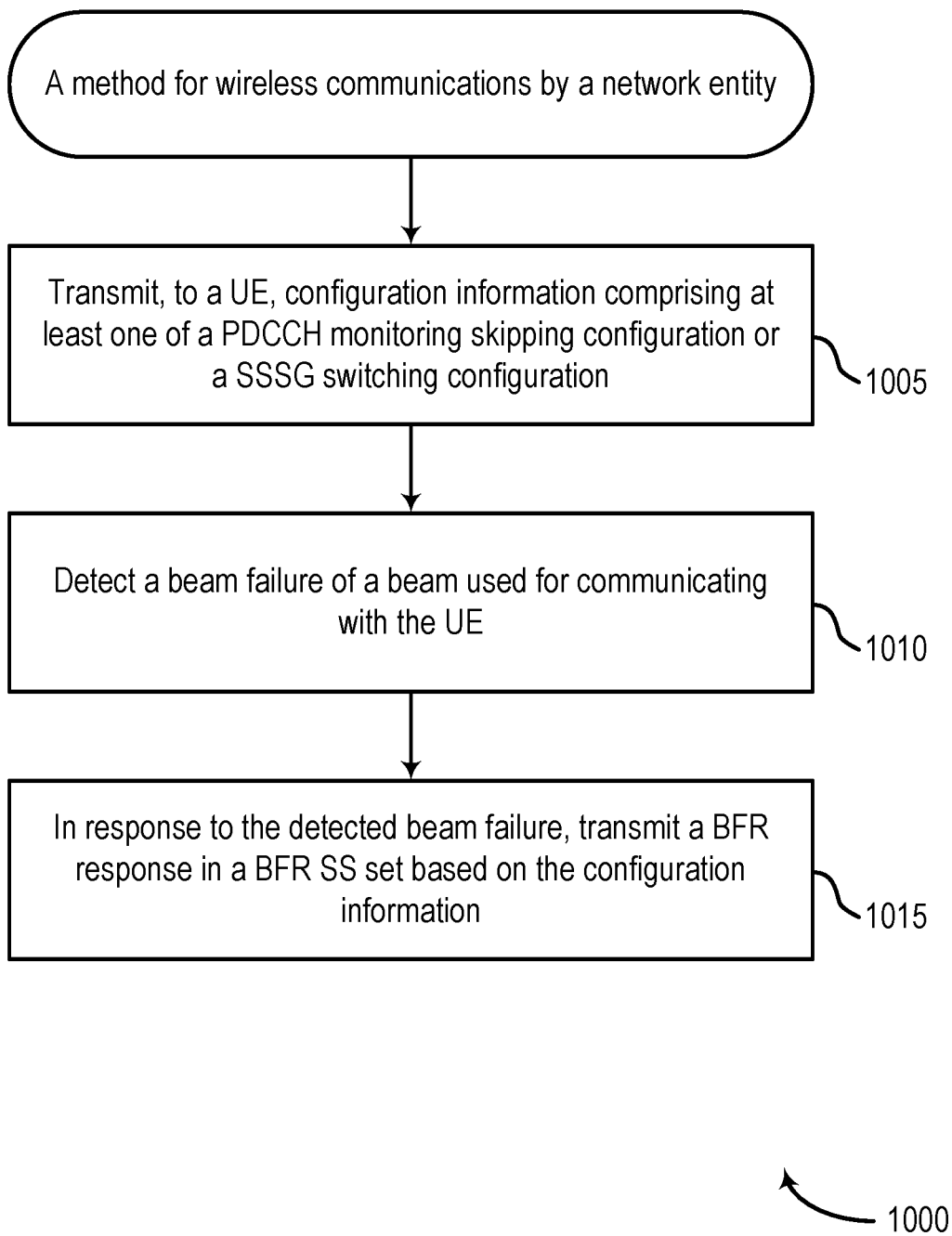
FIG. 10 depicts a method for wireless communications.

FIG. 10 shows an example of a method 1000 for wireless communications by a network entity, such as BS 102 of FIGS. 1 and 3, or a disaggregated base station as discussed with respect to FIG. 2.

Method 1000 begins at step 1005 with transmitting, to a UE, configuration information comprising at least one of a PDCCH monitoring skipping configuration or a SSSG switching configuration. In some cases, the operations of this step refer to, or may be performed by, circuitry for transmitting and/or code for transmitting as described with reference to FIG. 12.

Method 1000 then proceeds to step 1010 with detecting a beam failure of a beam used for communicating with the UE. In some cases, the operations of this step refer to, or may be performed by, circuitry for detecting and/or code for detecting as described with reference to FIG. 12.

Method 1000 then proceeds to step 1015 with, in response to the detected beam failure, transmitting a BFR response in a BFR SS set based on the configuration information. In some cases, the operations of this step refer to, or may be performed by, circuitry for transmitting and/or code for transmitting as described with reference to FIG. 12.

In some aspects, the configuration information comprises the PDCCH monitoring skipping configuration configuring the UE to skip PDCCH monitoring for a skip duration.

In some aspects, the configuration information configures the UE to monitor the BFR SS set for the BFR response regardless of whether the UE is skipping the PDCCH monitoring for the skip duration according to the PDCCH monitoring skipping configuration.

In some aspects, the method 1000 further includes receiving a random access preamble from the UE in response to the detected beam failure, wherein the configuration information configures the UE to monitor, after transmission of the random access preamble, the BFR SS set for the BFR response regardless of whether the UE is skipping the PDCCH monitoring for the skip duration according to the PDCCH monitoring skipping configuration. In some cases, the operations of this step refer to, or may be performed by, circuitry for receiving and/or code for receiving as described with reference to FIG. 12.

In some aspects, the configuration information comprises the SSSG switching configuration configuring the UE to switch between monitoring a first SSSG and monitoring a second SSSG.

In some aspects, the configuration information includes an indication of the first SSSG to monitor and the second SSSG to monitor.

In some aspects, the second SSSG does not include the BFR SS set.

In some aspects, the configuration information configures the UE to monitor the BFR SS set for the BFR response regardless of which the first SSSG or the second SSSG is being monitored by the UE according to the SSSG switching configuration.

In some aspects, the method 1000 further includes receiving a random access preamble from the UE in response to the detected beam failure, wherein the configuration information configures the UE to monitor, after transmission of the random access preamble, the BFR SS set for the BFR response regardless of which of the first SSSG or the second SSSG is being monitored by the UE according to the SSSG configuration. In some cases, the operations of this step refer to, or may be performed by, circuitry for receiving and/or code for receiving as described with reference to FIG. 12.

In some aspects, the first SSSG is a default SSSG including the BFR SS set; and the second SSSG is a non-default SSSG that does not include the BFR SS set.

In some aspects, the configuration information further includes an indication of an SSSG timer for triggering a switch from the non-default SSSG to the default SSSG based on the detected beam failure.

In some aspects, one SS set from each of the first SSSG and the second SSSG is configured as the BFR SS set; and the configuration information configures the UE to monitor the one SS set in one of the first SSSG or the second SSSG after the beam failure is detected.

Figure 12:
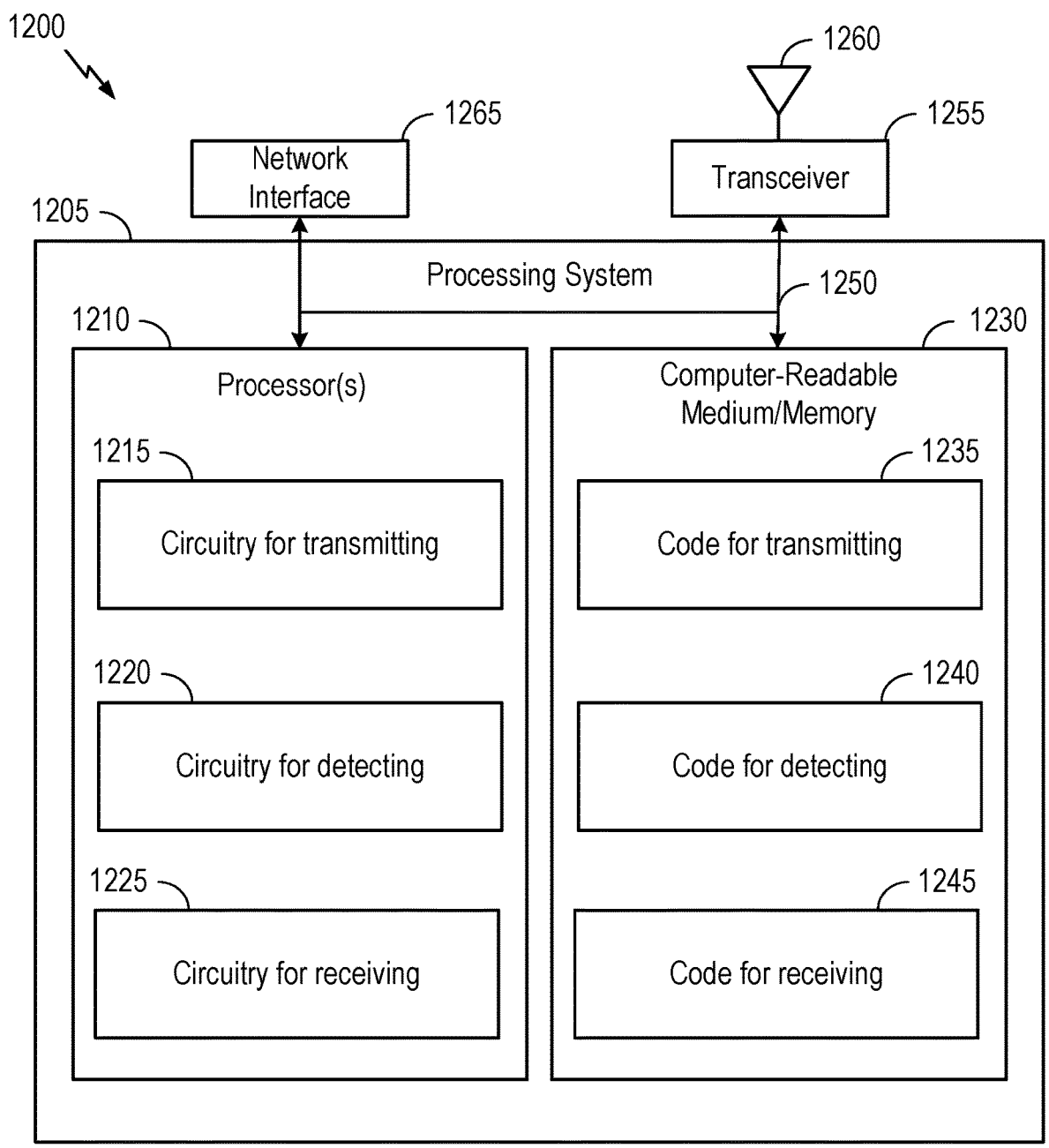
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1105 coupled to the transceiver 1155 (e.g., a transmitter and/or a receiver). The transceiver 1155 is configured to transmit and receive signals for the communications device 1100 via the antenna 1160, such as the various signals as described herein. The processing system 1105 may be configured to perform processing functions for the communications device 1100, including processing signals received and/or to be transmitted by the communications device 1100.

The processing system 1105 includes one or more processors 1110. In various aspects, the one or more processors 1110 may be representative of one or more of receive processor 358, transmit processor 364, TX MIMO processor 366, and/or controller/processor 380, as described with respect to FIG. 3. The one or more processors 1110 are coupled to a computer-readable medium/memory 1170 via a bus 1150. In certain aspects, the computer-readable medium/memory 1170 is configured to store instructions (e.g., computer-executable code) that when executed by the one or more processors 1110, cause the one or more processors 1110 to perform the method 900 described with respect to FIG. 9, or any aspect related to it. Note that reference to a processor performing a function of communications device 1100 may include one or more processors 1110 performing that function of communications device 1100.

In the depicted example, computer-readable medium/memory 1170 stores code (e.g., executable instructions), such as code for receiving 1175, code for detecting 1180, code for taking one or more actions 1185, code for monitoring 1190, code for transmitting 1195, code for switching 1197, and code for starting 1199. Processing of the code for receiving 1175, code for detecting 1180, code for taking one or more actions 1185, code for monitoring 1190, code for transmitting 1195, code for switching 1197, and code for starting 1199 may cause the communications device 1100 to perform the method 900 described with respect to FIG. 9, or any aspect related to it.

The one or more processors 1110 include circuitry configured to implement (e.g., execute) the code stored in the computer-readable medium/memory 1170, including circuitry such as circuitry for receiving 1115, circuitry for detecting 1120, circuitry for taking one or more actions 1125, circuitry for monitoring 1130, circuitry for transmitting 1135, circuitry for switching 1140, and circuitry for starting 1145. Processing with circuitry for receiving 1115, circuitry for detecting 1120, circuitry for taking one or more actions 1125, circuitry for monitoring 1130, circuitry for transmitting 1135, circuitry for switching 1140, and circuitry for starting 1145 may cause the communications device 1100 to perform the method 900 described with respect to FIG. 9, or any aspect related to it.

Various components of the communications device 1100 may provide means for performing the method 900 described with respect to FIG. 9, or any aspect related to it. For example, means for transmitting, sending or outputting for transmission may include transceivers 354 and/or antenna(s) 352 of the UE 104 illustrated in FIG. 3 and/or the transceiver 1155 and the antenna 1160 of the communications device 1100 in FIG. 11. Means for receiving or obtaining may include transceivers 354 and/or antenna(s) 352 of the UE 104 illustrated in FIG. 3 and/or the transceiver 1155 and the antenna 1160 of the communications device 1100 in FIG. 11.

FIG. 12 depicts aspects of an example communications device 1200. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1255 (e.g., a transmitter and/or a receiver) and/or a network interface 1265. The transceiver 1255 is configured to transmit and receive signals for the communications device 1200 via the antenna 1260, such as the various signals as described herein. The network interface 1265 is configured to obtain and send signals for the communications device 1200 via communication link(s), such as a backhaul link, midhaul link, and/or fronthaul link as described herein, such as with respect to FIG. 2. The processing system 1205 may be configured to perform processing functions for the communications device 1200, including processing signals received and/or to be transmitted by the communications device 1200.

The processing system 1205 includes one or more processors 1210. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10, or any aspect related to it. Note that reference to a processor of communications device 1200 performing a function may include one or more processors 1210 of communications device 1200 performing that function.

In the depicted example, the computer-readable medium/memory 1230 stores code (e.g., executable instructions), such as code for transmitting 1235, code for detecting 1240, and code for receiving 1245. Processing of the code for transmitting 1235, code for detecting 1240, and code for receiving 1245 may cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry such as circuitry for transmitting 1215, circuitry for detecting 1220, and circuitry for receiving 1225. Processing with circuitry for transmitting 1215, circuitry for detecting 1220, and circuitry for receiving 1225 may cause the communications device 1200 to perform the method 1000 as described with respect to FIG. 10, or any aspect related to it.

Various components of the communications device 1200 may provide means for performing the method 1000 as described with respect to FIG. 10, or any aspect related to it. Means for transmitting, sending or outputting for transmission may include transceivers 332 and/or antenna(s) 334 of the BS 102 illustrated in FIG. 3 and/or the transceiver 1255 and the antenna 1260 of the communications device 1200 in FIG. 12. Means for receiving or obtaining may include transceivers 332 and/or antenna(s) 334 of the BS 102 illustrated in FIG. 3 and/or the transceiver 1255 and the antenna 1260 of the communications device 1200 in FIG. 12.

Example Clauses

Implementation examples are described in the following numbered clauses:

Clause 1: A method for wireless communications by a UE, comprising: receiving, from a network entity, configuration information comprising at least one of a PDCCH monitoring skipping configuration or a SSSG switching configuration; detecting a beam failure of a beam used for communicating with the network entity; and in response to the detected beam failure, taking one or more actions to monitor a BFR SS set for a BFR response from the network entity based, in part, on the configuration information.

Clause 2: The method of Clause 1, wherein the configuration information comprises the PDCCH monitoring skipping configuration configuring the UE to skip PDCCH monitoring for a skip duration.

Clause 3: The method of Clause 2, wherein taking the one or more actions comprises monitoring the BFR SS set for the BFR response regardless of whether the UE is skipping the PDCCH monitoring for the skip duration according to the PDCCH monitoring skipping configuration.

Clause 4: The method of Clause 2, wherein taking the one or more actions comprises: transmitting a random access preamble in response to detecting the beam failure; and monitoring, after transmitting the random access preamble, the BFR SS set for the BFR response regardless of whether the UE is skipping the PDCCH monitoring for the skip duration according to the PDCCH monitoring skipping configuration.

Clause 5: The method of any one of Clauses 1-4, wherein the configuration information comprises the SSSG switching configuration configuring the UE to switch between monitoring a first SSSG and monitoring a second SSSG.

Clause 6: The method of Clause 5, wherein the configuration information includes an indication of the first SSSG to monitor and the second SSSG to monitor.

Clause 7: The method of Clause 6, wherein the second SSSG does not include the BFR SS set.

Clause 8: The method of Clause 7, wherein taking the one or more actions comprises monitoring the BFR SS set for the BFR response regardless of which the first SSSG or the second SSSG is being monitored by the UE according to the SSSG switching configuration.

Clause 9: The method of Clause 5, wherein taking the one or more actions comprises: transmitting a random access preamble in response to detecting the beam failure; and monitoring, after transmitting the random access preamble, the BFR SS set for the BFR response regardless of which of the first SSSG or the second SSSG is being monitored by the UE according to the SSSG configuration.

Clause 10: The method of Clause 5, wherein: the first SSSG is a default SSSG including the BFR SS set; and the second SSSG is a non-default SSSG that does not include the BFR SS set.

Clause 11: The method of Clause 10, wherein the configuration information further includes an indication of an SSSG timer for triggering a switch from the non-default SSSG to the default SSSG based on the detected beam failure.

Clause 12: The method of Clause 11, wherein detecting the beam failure comprises detecting the beam failure while monitoring the non-default SSSG.

Clause 13: The method of Clause 12, wherein taking the one or more actions comprises: starting the SSSG timer; switching to the default SSSG upon expiration of the SSSG timer; and monitoring the BFR SS set in the default SSSG after switching to the default SSSG.

Clause 14: The method of Clause 12, wherein taking the one or more actions comprises: starting the SSSG timer; transmitting a random access preamble in response to detecting the beam failure; switching to the default SSSG after transmitting the random access preamble and prior to expiration of the SSSG timer; and monitoring the BFR SS set in the default SSSG after switching to the default SSSG.

Clause 15: The method of Clause 5, wherein: one SS set from each of the first SSSG and the second SSSG is configured as the BFR SS set; and taking the one or more actions comprises, after detecting the beam failure, monitoring the one SS set in one of the first SSSG or the second SSSG.

Clause 16: A method for wireless communications by a network entity, comprising: transmitting, to a UE, configuration information comprising at least one of a PDCCH monitoring skipping configuration or a SSSG switching configuration; detecting a beam failure of a beam used for communicating with the UE; and in response to the detected beam failure, transmitting a BFR response in a BFR SS set based on the configuration information.

Clause 17: The method of Clause 16, wherein the configuration information comprises the PDCCH monitoring skipping configuration configuring the UE to skip PDCCH monitoring for a skip duration.

Clause 18: The method of Clause 17, wherein the configuration information configures the UE to monitor the BFR SS set for the BFR response regardless of whether the UE is skipping the PDCCH monitoring for the skip duration according to the PDCCH monitoring skipping configuration.

Clause 19: The method of Clause 17, further comprising: receiving a random access preamble from the UE in response to the detected beam failure, wherein the configuration information configures the UE to monitor, after transmission of the random access preamble, the BFR SS set for the BFR response regardless of whether the UE is skipping the PDCCH monitoring for the skip duration according to the PDCCH monitoring skipping configuration.

Clause 20: The method of any one of Clauses 16-19, wherein the configuration information comprises the SSSG switching configuration configuring the UE to switch between monitoring a first SSSG and monitoring a second SSSG.

Clause 21: The method of Clause 20, wherein the configuration information includes an indication of the first SSSG to monitor and the second SSSG to monitor.

Clause 22: The method of Clause 21, wherein the second SSSG does not include the BFR SS set.

Clause 23: The method of Clause 22, wherein the configuration information configures the UE to monitor the BFR SS set for the BFR response regardless of which the first SSSG or the second SSSG is being monitored by the UE according to the SSSG switching configuration.

Clause 24: The method of Clause 20, further comprising: receiving a random access preamble from the UE in response to the detected beam failure, wherein the configuration information configures the UE to monitor, after transmission of the random access preamble, the BFR SS set for the BFR response regardless of which of the first SSSG or the second SSSG is being monitored by the UE according to the SSSG configuration.

Clause 25: The method of Clause 20, wherein: the first SSSG is a default SSSG including the BFR SS set; and the second SSSG is a non-default SSSG that does not include the BFR SS set.

Clause 26: The method of Clause 25, wherein the configuration information further includes an indication of an SSSG timer for triggering a switch from the non-default SSSG to the default SSSG based on the detected beam failure.

Clause 27: The method of Clause 20, wherein: one SS set from each of the first SSSG and the second SSSG is configured as the BFR SS set; and the configuration information configures the UE to monitor the one SS set in one of the first SSSG or the second SSSG after the beam failure is detected.

Clause 28: An apparatus, comprising: a memory comprising executable instructions; and a processor configured to execute the executable instructions and cause the apparatus to perform a method in accordance with any one of Clauses 1-27.

Clause 29: An apparatus, comprising means for performing a method in accordance with any one of Clauses 1-27.

Clause 30: A non-transitory computer-readable medium comprising executable instructions that, when executed by a processor of an apparatus, cause the apparatus to perform a method in accordance with any one of Clauses 1-27.

Clause 31: A computer program product embodied on a computer-readable storage medium comprising code for performing a method in accordance with any one of Clauses 1-27.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
receiving, from a network entity, configuration information comprising a physical downlink control channel (PDCCH) monitoring skipping configuration configuring the UE to skip PDCCH monitoring for a skip duration;
detecting a beam failure of a beam used for communicating with the network entity; and
in response to the detected beam failure, taking one or more actions to monitor a beam failure recovery (BFR) search space (SS) set for a BFR response from the network entity based, in part, on the configuration information, wherein taking the one or more actions comprises:
transmitting a random access preamble in response to detecting the beam failure; and
monitoring, after transmitting the random access preamble, the BFR SS set for the BFR response regardless of whether the UE is skipping the PDCCH monitoring for the skip duration according to the PDCCH monitoring skipping configuration.

2. The method of claim 1, wherein the configuration information comprises an SS set group (SSSG) switching configuration configuring the UE to switch between monitoring a first SSSG and monitoring a second SSSG.

3. The method of claim 2, wherein the configuration information includes an indication of the first SSSG to monitor and the second SSSG to monitor.

4. The method of claim 3, wherein the second SSSG does not include the BFR SS set.

5. The method of claim 4, wherein taking the one or more actions comprises monitoring the BFR SS set for the BFR response regardless of which the first SSSG or the second SSSG is being monitored by the UE according to the SSSG switching configuration.

6. The method of claim 2, wherein taking the one or more actions comprises:

monitoring, after transmitting the random access preamble, the BFR SS set for the BFR response regardless of which of the first SSSG or the second SSSG is being monitored by the UE according to the SSSG configuration.

7. The method of claim 2, wherein:
the first SSSG is a default SSSG including the BFR SS set, and
the second SSSG is a non-default SSSG that does not include the BFR SS set.

8. The method of claim 7, wherein the configuration information further includes an indication of an SSSG timer for triggering a switch from the non-default SSSG to the default SSSG based on the detected beam failure.

9. The method of claim 8, wherein detecting the beam failure comprises detecting the beam failure while monitoring the non-default SSSG.

10. The method of claim 9, wherein taking the one or more actions comprises:
starting the SSSG timer;
switching to the default SSSG upon expiration of the SSSG timer; and
monitoring the BFR SS set in the default SSSG after switching to the default SSSG.

11. The method of claim 9, wherein taking the one or more actions comprises:
starting the SSSG timer;
switching to the default SSSG after transmitting the random access preamble and prior to expiration of the SSSG timer; and
monitoring the BFR SS set in the default SSSG after switching to the default SSSG.

12. The method of claim 2, wherein:
one SS set from each of the first SSSG and the second SSSG is configured as the BFR SS set; and
taking the one or more actions comprises, after detecting the beam failure, monitoring the one SS set in one of the first SSSG or the second SSSG.

13. A method for wireless communications by a network entity, comprising:
transmitting, to a user equipment (UE), configuration information comprising at least one of a physical downlink control channel (PDCCH) monitoring skipping configuration configuring the UE to skip PDCCH monitoring for a skip duration;
detecting a beam failure of a beam used for communicating with the UE;
in response to the detected beam failure, transmitting a beam failure recovery (BFR) response in a BFR search space (SS) set based on the configuration information; and
receiving a random access preamble from the UE in response to the detected beam failure, wherein the configuration information configures the UE to monitor, after transmission of the random access preamble, the BFR SS set for the BFR response regardless of whether the UE is skipping the PDCCH monitoring for the skip duration according to the PDCCH monitoring skipping configuration.

14. The method of claim 13, wherein the configuration information comprises an SS set group (SSSG) switching configuration configuring the UE to switch between monitoring a first SSSG and monitoring a second SSSG.

15. The method of claim 14, wherein the configuration information includes an indication of the first SSSG to monitor and the second SSSG to monitor.

16. The method of claim 15, wherein the second SSSG does not include the BFR SS set.

17. The method of claim 16, wherein the configuration information configures the UE to monitor the BFR SS set for the BFR response regardless of which the first SSSG or the second SSSG is being monitored by the UE according to the SSSG switching configuration.

18. The method of claim 14, wherein the configuration information configures the UE to monitor, after transmission of the random access preamble, the BFR SS set for the BFR response regardless of which of the first SSSG or the second SSSG is being monitored by the UE according to the SSSG configuration.

19. The method of claim 14, wherein:
the first SSSG is a default SSSG including the BFR SS set, and
the second SSSG is a non-default SSSG that does not include the BFR SS set.

20. The method of claim 19, wherein the configuration information further includes an indication of an SSSG timer for triggering a switch from the non-default SSSG to the default SSSG based on the detected beam failure.

21. The method of claim 14, wherein:
one SS set from each of the first SSSG and the second SSSG is configured as the BFR SS set; and
the configuration information configures the UE to monitor the one SS set in one of the first SSSG or the second SSSG after the beam failure is detected.

22. A user equipment (UE) configured for wireless communication, comprising:
at least one memory comprising instructions; and
one or more processors individually or collectively configured to execute the instructions and cause the UE to:
receive, from a network entity, configuration information comprising a physical downlink control channel (PDCCH) monitoring skipping configuration configuring the UE to skip PDCCH monitoring for a skip duration;
detect a beam failure of a beam used for communicating with the network entity; and
in response to the detected beam failure, take one or more actions to monitor a beam failure recovery (BFR) search space (SS) set for a BFR response from the network entity based, in part, on the configuration information, wherein in order to take the one or more actions, the one or more processors are configured to cause the UE to:
transmit a random access preamble in response to detecting the beam failure; and
monitor, after transmitting the random access preamble, the BFR SS set for the BFR response regardless of whether the UE is skipping the PDCCH monitoring for the skip duration according to the PDCCH monitoring skipping configuration.

23. A network entity configured for wireless communication, comprising:
at least one memory comprising instructions; and
one or more processors individually or collectively configured to execute the instructions and cause the network entity to:
transmit, to a user equipment (UE), configuration information comprising a physical downlink control channel (PDCCH) monitoring skipping configuration configuring the UE to skip PDCCH monitoring for a skip duration;

detect a beam failure of a beam used for communicating with the UE;

in response to the detected beam failure, transmit a beam failure recovery (BFR) response in a BFR search space (SS) set based on the configuration information; and receive a random access preamble from the UE in response to the detected beam failure, wherein the configuration information configures the UE to monitor, after transmission of the random access preamble, the BFR SS set for the BFR response regardless of whether the UE is skipping the PDCCH monitoring for the skip duration according to the PDCCH monitoring skipping configuration.

\* \* \* \* \*